March 2, 1954  G. E. DATH  2,670,948
FRICTION SHOCK ABSORBER FOR RAILWAY CAR TRUCKS
Filed May 16, 1950  2 Sheets-Sheet 1
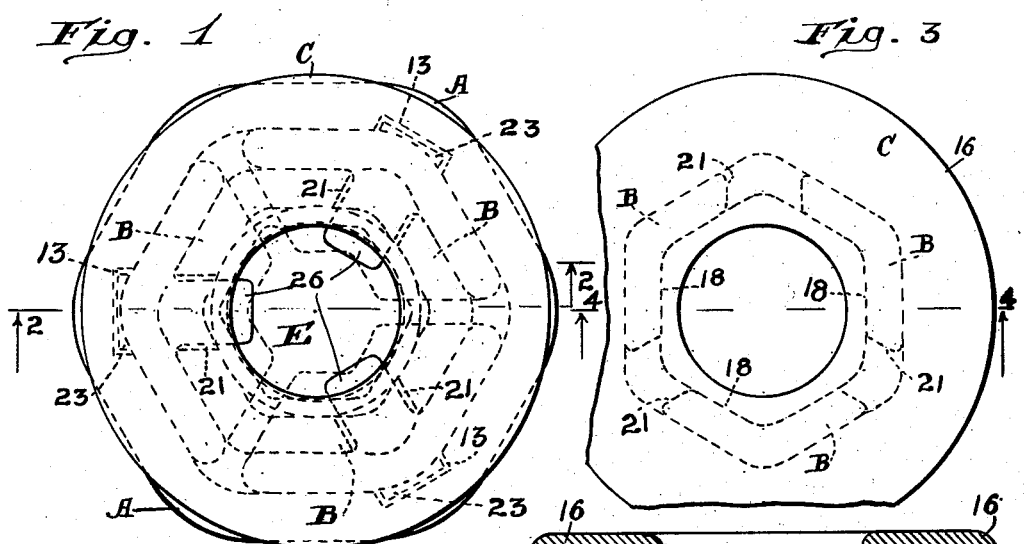
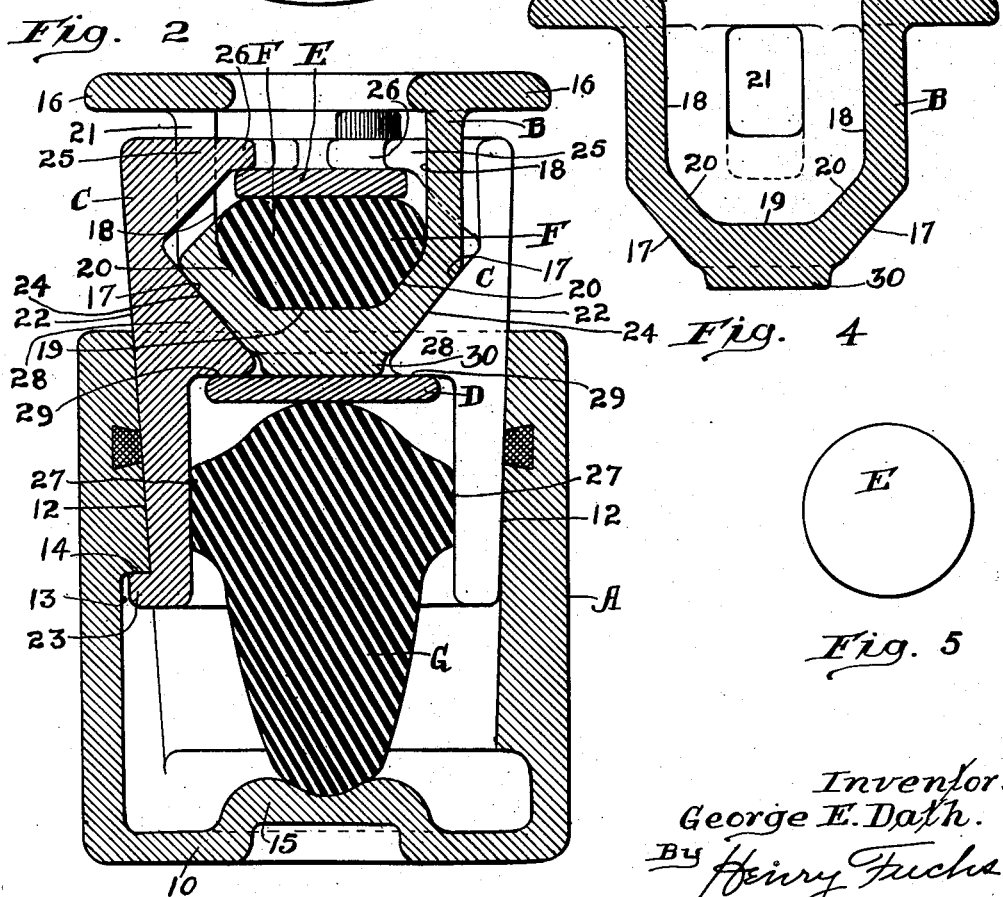
Inventor:
George E. Dath.
By Henry Fuchs
Atty.

March 2, 1954 G. E. DATH 2,670,948
FRICTION SHOCK ABSORBER FOR RAILWAY CAR TRUCKS
Filed May 16, 1950 2 Sheets-Sheet 2
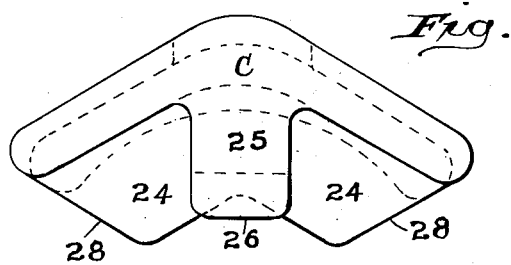
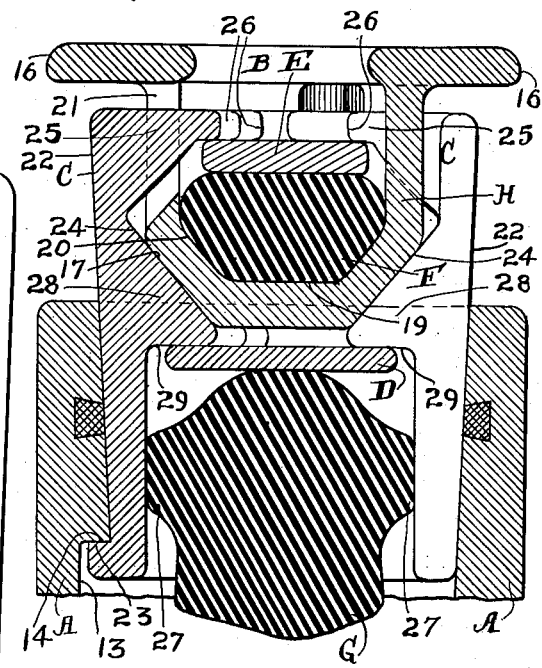
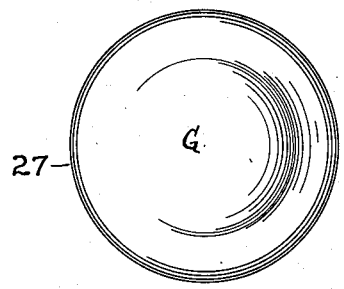
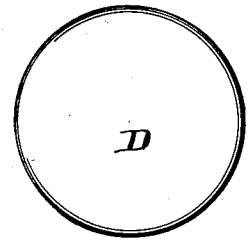
Inventor:
George E. Dath.

Patented Mar. 2, 1954

2,670,948

UNITED STATES PATENT OFFICE 2,670,948

FRICTION SHOCK ABSORBER FOR RAILWAY CAR TRUCKS

George E. Dath, Mokena, Ill., assignor to W. H. Miner, Inc., Chicago, Ill., a corporation of Delaware Application May 16, 1950, Serial No. 162,290

6 Claims. (Cl. 267—9)

This invention relates to improvements in friction shock absorbers especially adapted for use in connection with railway car truck springs for snubbing or dampening the vertical action of the same.

One object of the invention is to provide a friction shock absorber of the character indicated, including a friction casing, friction shoes slidingly telescoped within the casing, yielding means within the casing opposing inward movement of the shoes, and a pressure transmitting wedge member in wedging engagement with the shoes, wherein resilient means is provided reacting between the wedge and shoes for forcing the wedge into tight wedging engagement with said shoes.

A more specific object of the invention is to provide a mechanism as set forth in the preceding paragraph, wherein the wedge is in the form of a hollow member, and the shoes have fingers or flanges at their outer ends extending into said hollow member, and wherein the resilient means for forcing the wedge against the shoes, comprises a rubber block seated in the hollow wedge and bearing on a follower plate buttressed against the fingers or flanges of the shoes.

Other objects of the invention will more clearly appear from the description and claims hereinafter following.

In the accompanying drawings forming a part of this specification, Figure 1 is a top plan view of my improved shock absorber. Figure 2 is a transverse, vertical sectional view, corresponding substantially to the line 2—2 of Figure 1. Figure 3 is a top plan view, partly broken away, of the wedge member shown in Figure 1. Figure 4 is a transverse, vertical sectional view, corresponding substantially to the line 4—4 of Figure 3. Figure 5 is a plan view of the top follower disc shown in Figure 2. Figure 6 is a top plan view of one of the friction shoes of my improved shock absorber. Figure 7 is an elevational view of Figure 6, looking upwardly in said figure. Figure 8 is a plan view of the lower follower disc shown in Figure 2. Figure 9 is a top plan view of the lower cushioning block shown in Figure 2. Figure 1 is a broken view, similar to Figure 2, illustrating a modified form of wedge member.

Referring first to the embodiment of the invention illustrated in Figures 1 to 9 inclusive, my improved shock absorber comprises broadly a friction casing A, a wedge B, three friction shoes C—C—C, a lower follower disc D having shouldered engagement with the shoes between their ends, a second or upper follower disc E having shouldered engagement with the shoes at their outer ends, a rubber block F for forcing the wedge B against the shoes C—C—C, and a second rubber block G opposing inward movement of the follower disc D and the shoes C—C—C.

The friction casing A is in the form of a tubular member of substantially hexagonal, transverse cross section. The casing A is open at its upper end and has a transverse bottom wall 10 at its lower end. At said open upper end, the casing presents three longitudinally extending, inwardly converging, interior friction surfaces 12—12—12 of V-shaped, transverse cross section. The casing A is interiorly slotted at alternate corners thereof, as indicated at 13—13—13, one of the slots 13 being located at the meeting portions of each V-shaped friction surface 12 and terminating short of the upper end of the casing. The closed upper end of each slot provides a transverse stop shoulder 14. The bottom wall of the casing A has a hollow, upstanding, central boss 15 thereon, which provides a downwardly opening seat, adapted to accommodate the usual spring centering projection of the bottom spring plate of a cluster of truck springs of a railway car.

The wedge B is in the form of a hollow block having a laterally outwardly projecting, annular flange 16 at its upper end. At its inner end, the wedge B is provided with three wedge faces 17—17—17, of V-shaped, transverse cross section, arranged symmetrically about the longitudinal central axis of the wedge. The three faces 17—17—17 converge inwardly of the mechanism. At its bottom end, the wedge B has a central projection 30, which normally engages the lower follower disc D. The wedge B is open at the top and the hollow interior thereof is defined by vertical side walls 18—18—18, a horizontal bottom wall 19, and inclined side walls 20—20—20 connecting the vertical side walls to said bottom wall. The inclined side walls 20—20—20, together with the bottom wall 19, form a seat for the rubber block F. The side walls 18—18—18 are provided with openings therethrough in the form of vertical slots 21—21—21, which extend downwardly from the flange 16 to the upper ends of the inclined walls 20—20—20.

The three friction shoes C—C—C are of similar design, each shoe being in the form of an elongated plate member of V-shaped, transverse section and having a lengthwise extending, V-shaped friction surface 22 on its outer side, slidingly engaged with the corresponding V-shaped friction surface 12 of the casing A. At the lower end of each shoe is an outwardly projecting stop lug 23 guided in the corresponding slot 13 of the casing A, and engageable with the stop shoulder 14 of said slot to limit outward movement of said shoe. Between the ends thereof, each shoe C is provided with a lateral inward enlargement 28, having a V-shaped wedge face 24 on its upper side engaged with the corresponding V-shaped wedge face 17 of the wedge B. At the upper end, each shoe has a laterally inwardly extending, inclined, central rib 25, terminating in a horizontally extending arm or flange 26. The rib 25 and flange 26 of each shoe project through the slot 21 at the corresponding side of the wedge B, with the flange 26 protruding into the hollow portion of said wedge.

The rubber block F is seated in the pocket of the hollow wedge B, supported on the wall 19 of said pocket and resting against the inclined walls 20—20—20.

The follower disc E is supported on the rubber block F and is engaged beneath the arms or flanges 26—26—26 of the shoes C—C—C. This block is preferably under initial compression and presses the shoes upwardly with respect to the wedge B into tight wedging engagement with the wedge faces of the latter.

The rubber block G is in the form of an elongated bulblike member, circumferentially enlarged near its upper end portion, as shown in Figure 2, to provide an expanded section 27, which bears laterally against the inner sides of the shoes C—C—C. The block G is supported on the bottom wall 10 of the casing A, resting on the boss 15 of said bottom wall.

The follower disc D is supported on the upper end of the block G and bears on the underneath sides of the enlargements 28—28—28 of the shoes C—C—C, said enlargements presenting flat, bottom abutment faces 29—29—29, which engage with the upper side of the disc D. As shown in Figure 2, in the fully expanded condition of the shock absorber, the disc D is engaged by the projection 30 of the wedge B.

In the embodiment of the invention illustrated in Figure 10, the wedge, which is indicated by H, is identical with the wedge B, with the exception that it does not have the bottom end projection 30 of the wedge B. The remaining parts of the mechanism shown in Figure 10 are identical with the corresponding parts of the mechanism shown in Figures 1 to 9 inclusive, and are indicated by the same reference characters used in Figures 1 to 9 inclusive.

My improved shock absorber replaces one or more of the spring units of a truck spring cluster, being interposed between the top and bottom spring plates of said cluster.

The operation of the improved mechanism shown in Figures 1 to 9 inclusive is as follows: Upon the spring cluster of the truck of a railway car being compressed between the spring follower plates of the cluster, the wedge B is forced downwardly with respect to the casing A, spreading the shoes C—C—C apart and carrying the same inwardly of the casing, against the resistance of the rubber block G. As the shoes travel inwardly on the converging friction surfaces 12—12—12 of the casing A, a differential action is produced between the shoes and the wedge, the shoes slipping inwardly on the wedge faces of the wedge and being thus forced downwardly with respect to said wedge, thereby compressing the rubber block F against the wedge to increase the wedging pressure of the same. During this compressing action of the mechanism, the rubber block G is forced to spread laterally, due to its being compressed lengthwise between the follower disc D and the bottom wall 10 of the casing, thereby pressing laterally outwardly on the shoes C—C—C to force the same more firmly against the friction surfaces of the casing. As the shock absorber is thus actuated, the frictional resistance produced, together with the shock absorbing capacity provided by the rubber blocks, effectively snub the action of the truck springs.

The mechanism shown in Figure 10 operates precisely in the same manner as the mechanism shown in Figures 1 to 9 inclusive.

I claim:

1. In a friction shock absorber, the combination with a friction casing; of friction shoes slidingly telescoped within the casing; a wedge in wedging engagement with the shoes, said wedge protruding outwardly beyond the outer ends of the shoes to receive the actuating force; a rubber block within the casing bearing at opposite ends on said shoes and casing to yieldingly oppose inward movement of said shoes; and a second rubber block bearing at opposite ends on and reacting between said wedge and shoes, yieldingly opposing relative lengthwise separation of said wedge and shoes.

2. In a friction shock absorber, the combination with a friction casing having inwardly converging, interior friction surfaces; of friction shoes telescoped within said casing in sliding engagement with the friction surfaces thereof; a wedge in wedging engagement with said shoes, said wedge protruding outwardly beyond the outer ends of the shoes to receive the actuating force; a rubber block within the casing bearing at opposite ends on said casing and shoes to yieldingly oppose inward movement of said shoes; and a second rubber block pressing against and reacting between said wedge and shoes to yieldingly oppose relative lengthwise separation of said wedge and shoes.

3. In a friction shock absorber, the combination with a friction casing having inwardly converging, interior friction surfaces; of friction shoes telescoped within said casing in sliding engagement with the friction surfaces thereof; a wedge in wedging engagement with said shoes, said wedge having a portion thereof protruding outwardly beyond the outer ends of the shoes to receive the actuating force; resilient means within the casing bearing at opposite ends on said casing and shoes to yieldingly oppose inward movement of said shoes; and additional resilient means exerting pressure on and reacting between said wedge and shoes to yieldingly oppose relative lengthwise separation of said wedge and shoes.

4. In a friction shock absorber, the combination with a friction casing having inwardly converging, interior friction surfaces; of friction shoes telescoped within said casing in sliding engagement with the friction surfaces thereof; a wedge in wedging engagement with said shoes; a rubber block within the casing yieldingly opposing inward movement of said shoes, said rubber block being laterally expandible under lengthwise compression and bearing on the inner sides of said shoes; and a second rubber block exerting pressure on and reacting between said wedge and shoes to yieldingly oppose relative lengthwise separation of said wedge and shoes.

5. In a friction shock absorber, the combination with a friction casing having inwardly converging, interior friction surfaces; of friction shoes telescoped within the casing in sliding engagement with said friction surfaces; a wedge protruding beyond the outer ends of the shoes to receive the actuating force, said wedge having an upwardly facing seat at its inner end, said wedge being engaged between said shoes and having wedge faces in wedging engagement with said shoes, said shoes having inturned flanges at their outer ends overhanging said seat; a rubber block under initial compression supported on said seat and pressing at its upper end against said flanges of said shoes; and yielding means within the casing opposing inward movement of said shoes.

6. In a friction shock absorber, the combination with a friction casing having inwardly converging, interior friction surfaces; of friction shoes telescoped within the casing in sliding engagement with said friction surfaces; a wedge having a portion thereof protruding outwardly beyond the outer ends of the shoes to receive the actuating force, said wedge having an upwardly facing seat at its inner end, said wedge being engaged between said shoes and having wedge faces in wedging engagement with said shoes, said shoes having inturned flanges at their outer ends overhanging said seat; a rubber block under initial compression supported on said seat; a follower bearing on the upper end of said block and abutting the underneath sides of the flanges of said shoes; and yielding means within the casing opposing inward movement of said shoes.

GEORGE E. DATH.

References Cited in the file of this patent

UNITED STATES PATENTS

| Number | Name | Date |
| --- | --- | --- |
| 1,301,946 | Johnson | Apr. 29, 1919 |
| 1,555,696 | O'Connor | Sept. 29, 1925 |
| 2,229,750 | Lindstrom | Jan. 28, 1941 |
| 2,398,750 | Light | Apr. 16, 1946 |
| 2,402,146 | Cardwell | June 18, 1946 |
| 2,410,933 | Freeman | Nov. 12, 1946 |